United States Patent [19]
Powell

[11] 3,820,622
[45] June 28, 1974

[54] MODEL REFERENCED SPEED CONTROL FOR AUTOMOBILES

[75] Inventor: Barry K. Powell, Allen Park, Mich.

[73] Assignee: The Bendix Corporation, Southfield, Mich.

[22] Filed: July 30, 1973

[21] Appl. No.: 383,519

[52] U.S. Cl. .................................................. 180/98
[51] Int. Cl. ...................... B60k 27/00, B60k 33/00
[58] Field of Search ................... 180/98, 105 E, 109; 123/102; 343/112 TC, 112 S, 112 CA

[56] References Cited
UNITED STATES PATENTS

| | | | |
|---|---|---|---|
| 2,702,342 | 2/1955 | Korman | 180/98 X |
| 2,996,137 | 8/1961 | Chu et al. | 180/98 |
| 3,378,102 | 4/1968 | Collin et al. | 180/98 |
| 3,442,347 | 5/1969 | Hodgson et al. | 180/98 |
| 3,448,822 | 6/1969 | La Lone et al. | 180/98 |
| 3,689,882 | 9/1972 | Dessailly | 180/98 |
| 3,715,006 | 2/1973 | Walsh | 123/102 |

Primary Examiner—Allen N. Knowles
Attorney, Agent, or Firm—Lester L. Hallacher; Allen M. Krass

[57] ABSTRACT

An automatic control system for a vehicle moving in a line of traffic controls the vehicle speed as a function of an input overall speed control signal, provided to all of the vehicles, and the distance to the preceding vehicle, as detected by a vehicular radar system. A controller receives the radar signal, the input control signal and a signal proportional to the vehicle speed and adjusts the propulsive and braking forces on the vehicle to modify the controller operation to accommodate changed system parameter variations such as vehicle loading and wind change. A signal derived from the input control signal and the radar unit are applied to a computer which models the ideal behavior of the controller and the vehicle in response to the particular input signals. The outputs of this model are compared to signals representing the actual vehicle performance to develop control signals to adjust the operation of the controller.

14 Claims, 4 Drawing Figures

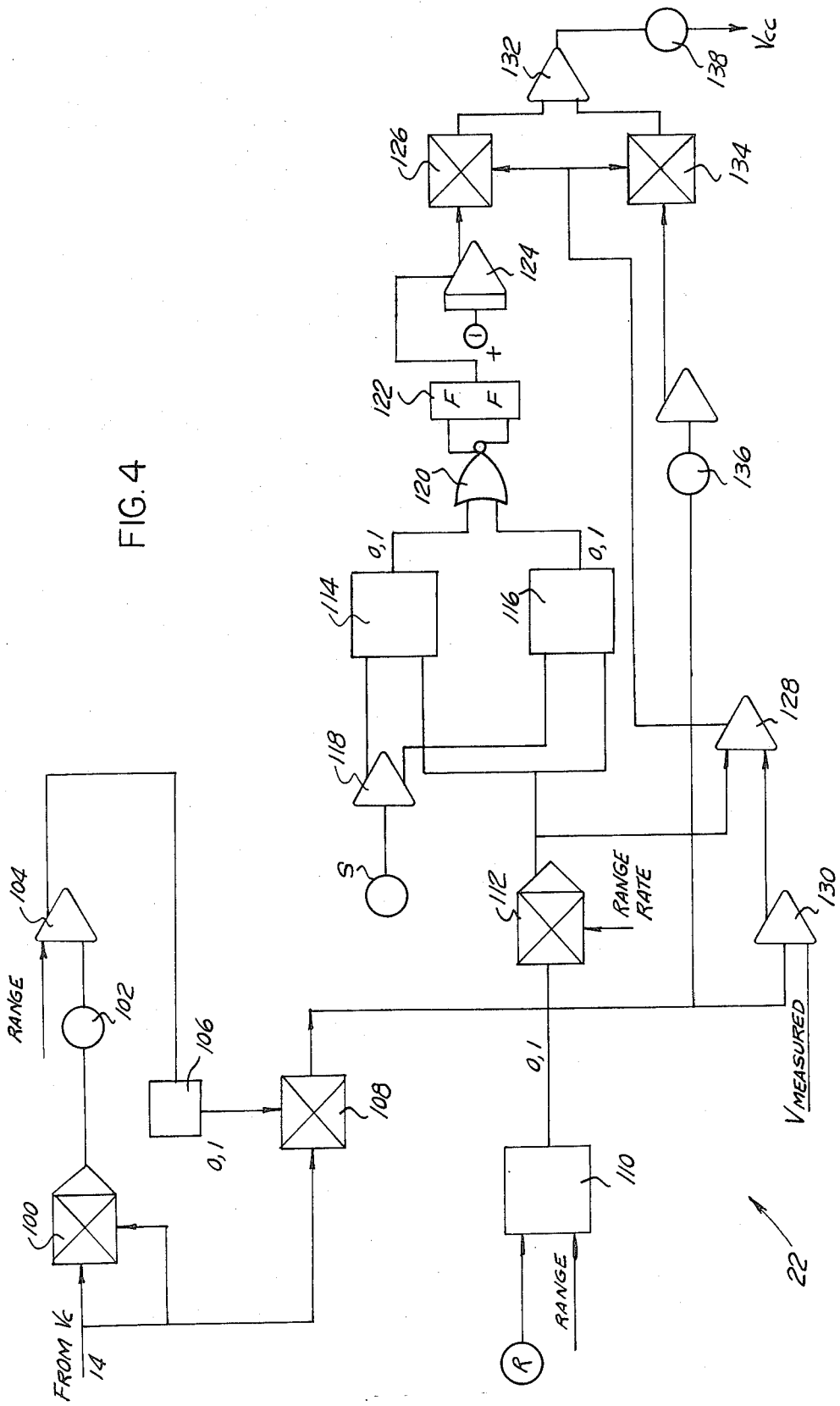

MODEL REFERENCED SPEED CONTROL FOR AUTOMOBILES

CROSS REFERENCES TO RELATED APPLICATIONS

U.S. Pat. No. 3,455,411 entitled AUTOMOBILE SPEED CONTROL, R.W. Carp et al.

U.S. Pat. No. 3,659,293 entitled RANGE DETECTING DOPPLER RADAR, Radha Raman Gupta.

U.S. application Ser. No. 75,056, filed Sept. 24, 1970 entitled DIPLEXED MULTI-FREQUENCY CW DOPPLER RADAR, William R. Faris.

The above referenced patents and application are assigned to the assignee of the present application and describe sub-systems which can optionally be employed in the inventive system.

BACKGROUND OF THE INVENTION

A number of systems have been proposed which would control the propulsive and braking forces applied to a vehicle to maintain the speed of the vehicle at a level set by an input signal adjusted by the driver of the vehicle or alternatively provided to the vehicle from an external source. Systems have also been described which combine such a speed control system with a vehicular radar system measuring the distance to a preceding vehicle or obstruction in roadway so that the vehicle's speed may be adjusted to maintain a controlled following distance between successive vehicles and to stop the vehicle in order to prevent a forward collision.

In all of these systems the input speed command signal and/or the radar produced following distance signal are applied to a controller along with feedback signals representative of the actual speed of the vehicle and the controller provides control signals to the propulsive and braking systems of the vehicle to continuously adjust the actual vehicle speed to the desired speed.

The control signals applied by the controller to the vehicle in response to a given deviation between the commanded and actual vehicle speeds must take into account variations which occur from time to time in the vehicle systems parameters that affect the speed response of a vehicle to a given control signal, such as variations in which loading, head winds, road grade and the like. Systems have been proposed which would actually measure the more significant of these parameters and adjust the controller operation accordingly, but these have proven quite complex and at best have provided a highly compromised type of operation.

SUMMARY OF THE PRESENT INVENTION

In its broadest form the present invention contemplates an automatic speed control system for a vehicle which continually seeks to maintain the propulsive and braking forces on the vehicle at such a level as to achieve a speed set by an operator control or provided from an external source wherein the operation of the controller is adaptively modified so as to provide optimum performance over a wide range of vehicle system parameters. The mode of operation of the controller used with the present invention is adjustable and is continuously modified as a function of the difference between signals representative of the actual operation of the vehicle and a similar set of signals provided by a computer which mathematically models the desired response of both the controller and the vehicle to the same input control signals applied to the controller. The controller operation is then continually modified so that the response of the vehicle to an applied set of control signals approaches the response of the model to those control signals independently of variations in the vehicle system parameters.

The invention further contemplates such a model reference adaptive control system for a vehicle wherein the input signal provided to the controller and to the model is modified as a function of the distance between the controlled vehicle and the preceding vehicle, the rate of change of that distance, and the time durations of undesirable rate differences between the two vehicles.

As will be described in detail in connection with the disclosure of a preferred embodiment of the invention, the input speed command signal is processed along with the radar range signal in accordance with several control laws:

1. The safe separation distance between two vehicles is calculated as a function of the square of the commanded speed. When the measured range falls below this calculated safe separation distance a zero speed command signal is applied to both the controller and the model, causing braking of the vehicle.

2. When the measured range exceeds a maximum indicating that the preceding vehicle is sufficiently distant so that no consideration need be given to it for safety purposes, the signal applied to the controller in the model is equal to the input control signal or a function of the difference between the input speed control signal and the actual speed of the vehicle.

3. When the preceding vehicle is beyond the safe separation distance but within the maximum radar range distance the signal applied to the controller and the model are modified as a function of change in the rate of the preceding vehicle and a control factor is also applied which is a function of the time period in which the rate of change of the range of the preceding vehicle exceeds a predetermined maximum. This insures that the control signal applied will be increased in intensity if an emergency situation approaches.

In the preferred embodiments of the system the reference model takes the form of a set of operational amplifiers connected to solve the differential equation represented by the desired controller-vehicle performance. As the solution is forced to the input control signal the outputs of the individual amplifiers assume values representative of the ideal vehicle performance characteristics. The model has three outputs representing change in vehicle position called for by the input control signal; change in vehicle velocity and change in vehicle acceleration. These signals are applied to three sensitivity computers which consist of similar operational amplifier arrangements with their parameters adjusted to model the sensitivity of vehicle position, velocity and acceleration respectively to changes in vehicle parameters. The outputs of these three sensitivity equation circuits are each multiplied by a function proportional to the difference between the actual vehicle change in position, the difference in vehicle velocity from the commanded velocity and the acceleration of the vehicle, and the equivalent signals respectively as generated by the reference model. Accordingly, when the actual performance of the vehicle equates with that of the model the outputs of the sensitivity equation calculations are reduced to zero. These adjusted outputs are used as scale factors applied to the actual measured vehicle performance characteristics before these characteristics are summed with the adjusted input command signal to derive the control signal for the vehicle braking and propulsion system.

BRIEF DESCRIPTION OF THE DRAWINGS

FIG. 4 is a schematic diagram of a sub-system for modifying the input control signal as a function of the radar range signal for application to the controller and model dynamics of the system of FIGS. 1–3.

Referring to FIG. 1 a vehicle to be controlled, schematically illustrated at 10, may constitute any form of self-powered vehicle including vehicles carrying their own power source or those deriving power from an external source such as "trolley cars". In the preferred embodiment of the invention the vehicle 10 constitutes an automobile powered by an internal combustion engine.

Figure 1:
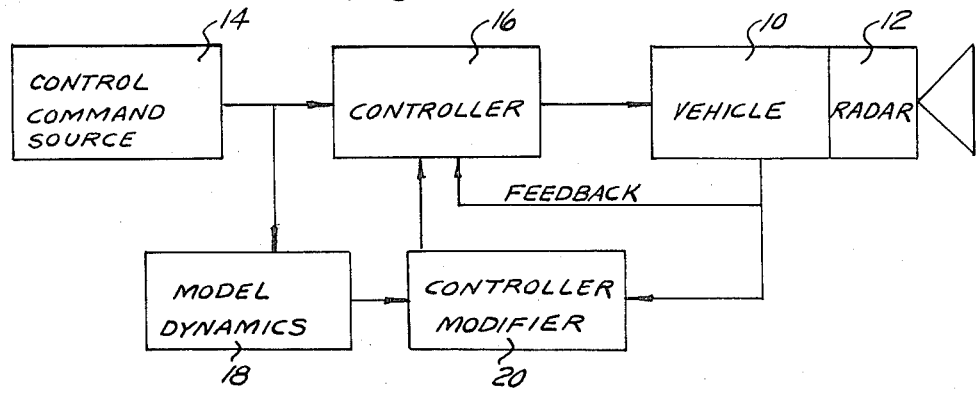
FIG. 1 is a block diagram of the preferred embodiment of the invention illustrating the broad relationship of the sub-systems forming the present invention.

The vehicle 10 is preferably equipped with an acceleration-braking system of the type operated by a single input control signal wherein a change in the signal in a first direction causes an increase in propulsive force achieved through either or both of an increase in power to the drive motors or a decrease in braking force, and a change in the control signal in the opposite direction results in a decrease in driving force and/or an increase in braking force.

The vehicle 10 is preferably equipped with a radar system 12 which generates a signal proportional to the distance or range to a vehicle preceding the controlled vehicle 10 or to a target of appreciable size in the path of the vehicle. This system will normally employ an active tansmitter of either microwaves or light and a receiver for reflected energy. Alternatively this range detection system may be of the passive type, employing only a receiver and depending upon some signal generated by the preceding vehicle. In the preferred embodiment of the invention the radar would be of the microwave doppler type. A system of this form is described in "A Diplexing Doppler Phase Comparison Radar" IEEE Transactions on Aerospace and Navagational Electronics ANE 10 (NO. 1, pp. 27–33) March 1963. This system provides a single output signal proportional to the range of the reflecting object.

The speed achieved by the vehicle 10 is set by a control command signal derived from a source 14 which may be either internal to the vehicle or external. For example, the signal may be derived form a driver selected "cruise control" type speed selection system intended to automatically maintain the vehicle at the preselected velocity irrespective of road grade, wind conditions and the like without attention from the driver. Alternatively the signal may be generated at a central traffic control station and transmitted to a plurality of vehicles moving on a roadway such as a turnpike. The signal may vary in accordance with weather conditions, the volume of traffic on the road, or the existence of emergency situations. This signal is intended to achieve an overall vehicle flow rate although the instantaneous speed of individual vehicles may vary of this selected rate.

The signal from the control command source 14 is applied to a controller 16 which also receives feedback signals from the vehicle 10 and from the radar unit 12 indicative of the speed of the vehicle and of the range to the preceding vehicle in traffic or to a forward obstacle in the roadway. Based on these signals, the controller 16 generates a single propulsion control signal for the vehicle 10 intended to cause the vehicle to achieve the speed commanded by the source 14, consistent with the traffic conditions sensed by the radar 12.

The servo-loop consisting of the controller, the vehicle and the feedback path must have dynamic stability, i.e., it must achieve the desired control in a minimum time without hunting or oscillation. If the parameters of the vehicle and its driving system were constant, no difficulty would be encountered in providing a controller configuration which would achieve this servo stability; however, the system parameters such as vehicle loading, road grade, headwind and the like are usually varying during the operation of the vehicle. This requires a continual adjustment in the control law built into the controller 16.

To achieve the desired mode of operation, independently of variations in the vehicle system parameters, the present invention incorporates a model reference computer 18 which receives the signal from the control command source 14 and generates a set of output signals representing the desired response of the controller-vehicle system to the particular input. These signals are provided to a controller modifier 20 along with the feedback signals from the vehicle 10 and radar 12. The modifier compares these two inputs and generates control signals which vary the operation of the controller 16 as a function of the deviation between the feedback signals and the model reference signals. If the feedback signals are substantially the same as the model reference outputs the controller-vehicle system is operating in the same manner as the model and no controller modifications are required. When the outputs of the model reference 18 differ from the feedback signals, proportional corrective signals are provided to the controller 16. For example, when the headwind increases the signal provided by the controller 16 to the vehicle 10 in order to follow a given change in the signal from the control command source 14 must be increased. The controller modifier 20 detects the failure of the vehicle to respond to a particular input signal change in the manner called for by the model reference 18 and modifies the parameters of the controller 16 accordingly.

Figure 2:
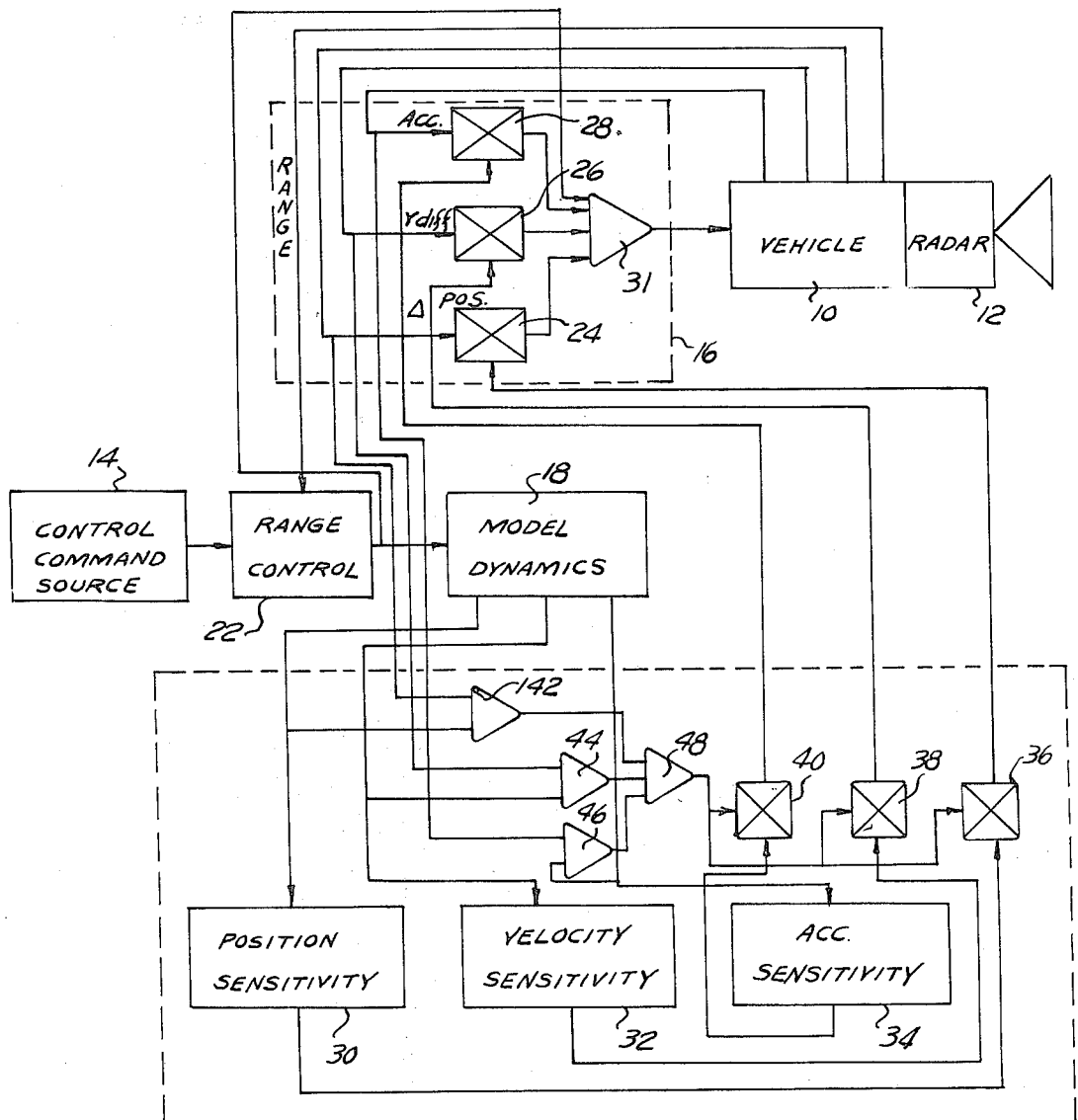
FIG. 2 is a partially block, partially schematic diagram disclosing the system of the present invention in greater detail than FIG. 1.

Certain aspects of the system of FIG. 1 are disclosed in greater detail in the diagram of FIG. 2. While the broad concept of the invention does not require the use of a radar type range detecting system 12 the preferred embodiment of the invention utilizes a range signal to modify the actual command signal provided to the controller 16 and the model reference computer 18 from the control command source 14 under certain conditions. As shown in FIG. 2 the output of the control command source is provided to a range control unit 22 which also receives the range signal developed by the radar 12. As will subsequently be described in detail in connection with the description of FIG. 4, under certain range conditions such as when the measured range is below the safe following distance between a pair of vehicles, the control signal provided to the controller and the model are substantially varied from the raw control signal provided by the source 14.

The preferred embodiment of the controller 16 essentially consists of three multipliers 24, 26 and 28 and and operational amplifier 30 acting as a summer. The feedback signals from the vehicle 10 and the radar system 12 are provided to these three multipliers and the controller. The multiplier 24 receives the feedback signal proportional to the perturbation position derived by integrating the vehicle velocity signal as will be described in connection with FIG. 4. The multiplier 26 receives a signal proportional to the difference between the actual velocity of the vehicle and a function of the commanded velocity as will be described in connection with FIG. 3. The potentiometer 28 receives a signal from an accelerometer associated with the vehicle 10. The outputs of these three multipliers as well as the output of the control command signal as modified by the range control 22 are provided to a summer 31 and the output of that summer represents the control signal provided to the vehicle 10.

Adjustments to the control law of the controller 16 are achieved by varying second inputs to the multipliers 24, 26 and 28. These signals are derived using three outputs from the model reference unit 18 which represent the perturbation in position, velocity and acceleration which the model 18 calculates should be achieved by the controller-vehicle system on the basis of its input signal. The signal representing the model perturbation in position is provided to a position sensitivity computer 30; the signal representing the velocity output of the model is provided to a velocity sensitivity computer 32; and the signal representing the acceleration output of the model is provided to an acceleration sensitivity computer 34. These three computers represent models of how the vehicle responds to changes in their particular vehicle parameters. The outputs of these three sensitivity computers are provided to three multipliers 36, 38 and 40 the outputs of which are respectively provided as second inputs to the multipliers 24, 26 and 28.

The second input to each of the multipliers 36, 38 and 40 is the same and is proportional to the difference between and calculated controller-vehicle performance as generated by the model reference computer 18 and the actual controller-vehicle performance is represented by the feedback signals from the vehicle 10. A first differential amplifier 42 receives inputs from the change in position output of the model reference unit 42 and the actual change of position feedback signal; a second differential amplifier 44 receives the output from the model reference unit representative of the differential velocity signal and also receives the velocity feedback signal from the vehicle; and a third differential amplifier 46 receives the calculated acceleration signal from the model and the actual acceleration signal from the vehicle.

The outputs of these three differential amplifiers are summed by an operational amplifier 48 and the output of that amplifier is used as a multiplying factor for the multipliers 36, 38 and 40. Accordingly, when the performance of the vehicle is in exact accord with the calculated performances derived by the computer, the outputs of the sensitivity circuits are effectively multiplied by zero so no correction is made to the settings of the multipliers 24, 26 and 28.

Figure 3:
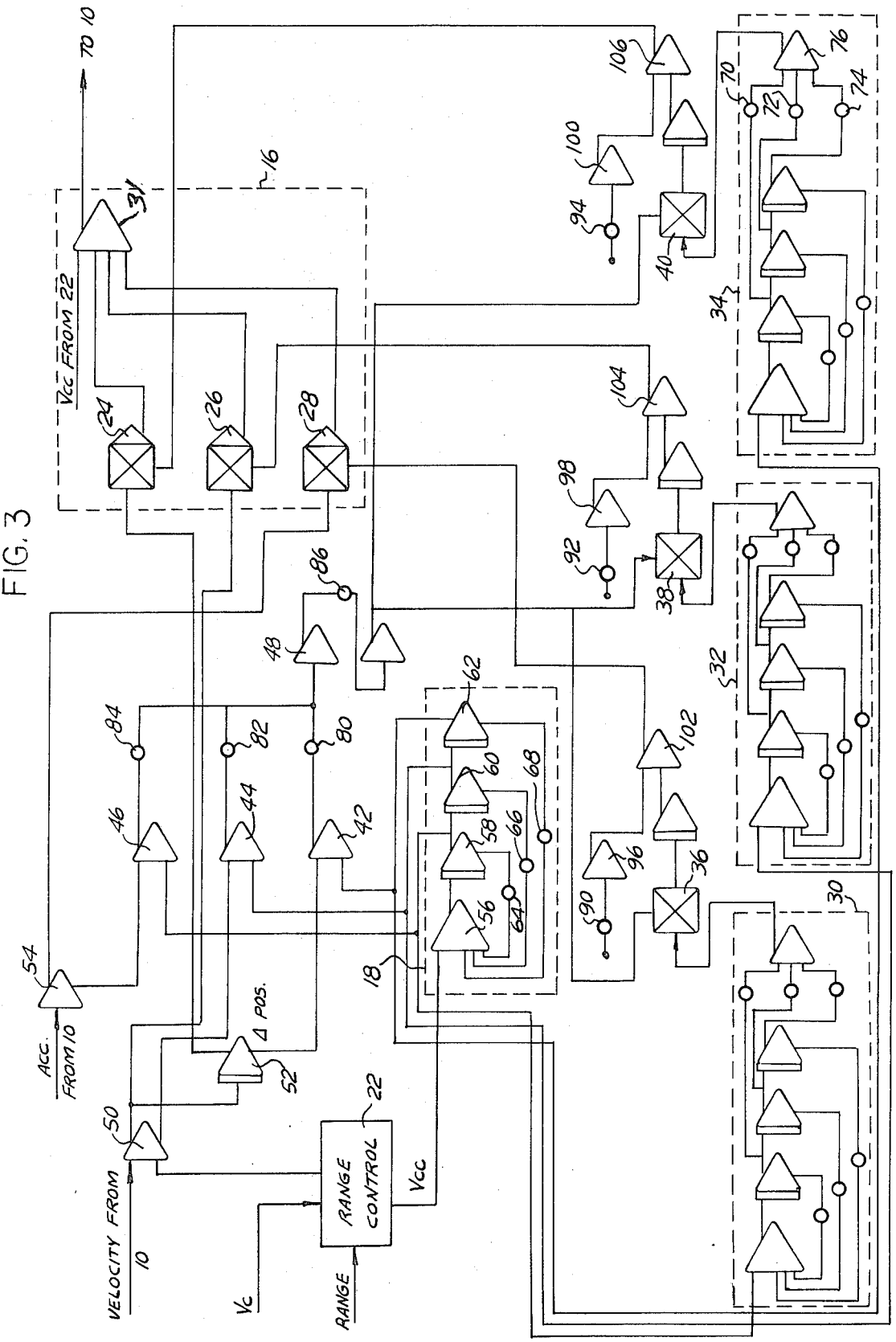
FIG. 3 is a schematic diagram of a preferred implementation of the present invention employing analog components.

As will be disclosed in connection with the description of FIG. 3 a constant value is added to the outputs of each of the multipliers 36, 38 and 40 to set an initial condition and to provide a real multiplying factor despite the equality of the output of the model dynamics and the actual vehicle performance.

Referring to FIG. 3, the model 18, the sensitivity circuits 30, 32 and 34 and the controller modifier 16 are disclosed in greater detail. The velocity signal from a transducer associated with the vehicle is applied to a differential amplifier 50 along with the input control command $V_{cc}$ to derive a signal proportional to the difference between the actual and commanded velocity. This signal is applied to the multiplier 26 as well as to an integrator amplifier 52 which generates a signal proportional to the perturbation in position for application to the multiplier 24. A signal from an accelerometer associated with the vehicle is applied to an operational amplifier 54 and its output is provided to the multiplier 28. The outputs of these three multipliers along with the output of the range control sub-system 22, which receives the raw input command signal $V_c$ and modifies it as a function of the range, to derive a signal termed $V_{cc}$, are applied to summing amplifier 31 which derives the single propulsion-braking control signal applied to the vehicle 10.

The model reference dynamics computer 18, which also receives the signal $V_{cc}$, is illustrated in detail as consisting of a summing amplifier 56 followed by a train of three integrating amplifiers 58, 60 and 62. The output of each integrating amplifier is provided to the next amplifier and the negative output of each of the three integrating amplifiers is fed back to the summing amplifier 56 through three constant adjusting potentiometers 64, 66 and 68. The circuit generates the differential values for the equation modeled by the circuit configuration for the solution represented by the input signal $V_{cc}$. The outputs of the amplifiers 58, 60 and 62 respectively represent the model acceleration, velocity, and position perturbation of the controller-vehicle system. Accordingly the output of the integrating amplifier 58 is provided to the acceleration sensitivity computer circuit 34; the output of the integrating amplifier 60 is provided to the velocity sensitivity computer 32 and the output of the integrating amplifier 62 is provided to the position perturbation sensitivity computer 30. Each of these computers is substantially identical in configuration to the computer 18, consisting of an input summing amplifier connected to a chain of three integrating amplifiers with the positive output of each of the integrating amplifiers being connected to the next amplifier and the negative output being returned to the summing amplifier through a potentiometer. The positive outputs of the integrating amplifiers are passed through three potentiometers 70, 72 and 74 in the circuit of the acceleration sensitivity computer 34 and like but unnumbered potentiometers in the two circuits 30 and 32 and the outputs of these potentiometers are summed by operational amplifier 76 in circuit 34 and similar unnumbered units in circuits 30 and 32. The constant of each of these sensitivity circuits are adjusted so that the circuit models the sensitivity of the vehicle to a change in its associated parameter. The potentiometers in the sensitivity circuits and in the model dynamics circuit 18 may be adjusted to achieve the desired performance characteristics. The output of the amplifier 76 in the acceleration sensitivity computer 34 is provided to the multiplier 40 and the outputs of the circuits 30 and 32 are provided to the multipliers 36 and 38 respectively.

The three outputs of the integrating amplifiers 58, 60 and 62 from the model reference computer 18 are also applied to the differential amplifiers 42, 44 and 46. The other input to the amplifier 42 is derived from the integrating amplifier 52 which provides a signal proportional to the perturbation in position of the vehicle. The second input to the amplifier 44 is derived from the negative output of differential amplifier 50 which provides a signal proportional to the difference between the input command velocity $V_c$ and the actual vehicle velocity. The third input to the differential amplifier 46 is derived from the negative output of the amplifier 44, representing the acceleration signal. The differential amplifiers 42, 44 and 46 provide outputs equal to the difference between their inputs. These signals are multiplied by constants set into potentiometers 80, 82 and 84 respectively and their outputs are then summed by amplifier 48. The output of the amplifier 48 is multiplied by another constant in the potentiometer 86 and the amplified output as produced by the amplifier 88 is provided to the second input of each of the three multipliers 36, 38 and 40 which receive the outputs of sensitivity computers 30, 32 and 34.

The initial state values for the output of the multipliers 36, 38 and 40 are set by potentiometers 90, 92 and 94 respectively. The outputs of these multipliers are passed through amplifiers 96, 98 and 100 respectively and summed with the amplified outputs of the multipliers 36, 38 and 40 by summing amplifiers 102, 104 and 106 respectively. The outputs of these amplifiers provide the three multiplying inputs to the multipliers 24, 26 and 28 and the controller 18.

The range control unit 22 which receives the input control command from the unit 14 and modifies it on the basis of the range signal before providing it to the model 18 and the controller 16 is illustrated in detail in FIG. 4. The input command $V_c$ of unit 14 is first squared by providing it to two inputs of a multiplier 100. The output of that multiplier is then multiplied by a constant by a potentiometer 102. The output represents the safe separation distance between the vehicle and the preceding vehicle as a function of the square of the commanded velocity. That safe separation distance is then compared with the actual measured range to the preceding vehicle by subtracting one quantity from the other in a differential amplifier 104. The output of amplifier 104, which is either positive or negative depending on whether the range is greater or less than the safe separation distance is provided, providing the output to a switching circuit 106 to generate a "one" output if the range exceeds the safe separation distance and a "zero" output if it is less than the safe separation distance.

The output of the switch 106 provides one input to a multiplier 108 and the quantity $V_c$ provides the other input. Accordingly the output of the multiplier 108 is equal to $V_c$ if the measured range exceeds the safe separation distance and equal to zero if the measured range is less than the safe separation distance. This quantity is termed $V_{c1}$. It represents one of the inputs to the differential amplifier 50 which calculates the difference between the actual velocity of the vehicle and the command velocity. When the measured range is less than the safe separation distance an emergency braking situation exists and signals are sent to the controller 16 to cause rapid braking of the vehicle.

The range signal is also compared with a maximum range signal R which is a measure of the maximum range distance in which the circuit need take range factors into consideration in a switching comparator circuit 110 which has a zero output if the measured range exceeds the maximum range R or a "one" value otherwise. The output of switch 110 is multiplied by a signal proportional to the rate of change of range. This may be developed internally from the range signal or it may be available from the radar unit. The output of this multiplier 112 is therefore equal to rate of change of range if the measured range is less than the maximum range or equal to zero if the measured range exceeds the maximum range.

The output of the circuit 112 is provided to a pair of switching comparators 114 and 116. The other inputs of these two units came from the positive and negative outputs respectively of an operational amplifier 118 which receives the separation signal S. Comparator 114 accordingly provides a "one" output if the rate of change of range signal is greater than +S and comparator 116 provides a "one" output if the rate of change of the range signal is less than −S. An OR gate 120 receives the outputs of both comparators and provides a high output if either of these conditions are true and acts to set a flip-flop 122. If the rate of change of range signal falls within the limits set by + or −S the flip-flop 122 is reset by the low output of gate 120.

While the flip-flop 122 is set it provides an output to an integrating amplifier 124 which has a constant as its input. Whenever the rate of change of range signal is outside of the + or −S range the output of the integrating amplifier 124 is a voltage proportional to the time which has elapsed since the rate signal last began to exceed the S range.

This signal is applied to one input of a multiplier 126. The other input of that multiplier is provided by a differential amplifier 128 which has the rate of change of range signal (or a zero signal if the range exceeds R) from the multiplier 112 as one of its inputs. The other input to the differential amplifier 128 comes from a differential amplifier 130 which receives the measured velocity of the vehicle and signal $Vc_1$ from the multiplier 108. The output of the differential amplifier 128 is proportional to the perturbation of velocity of the preceding vehicle since the output of the differential amplifier 130 compensates the rate of change of range signal for variations in range resulting from the velocity variations of the vehicle 10.

The multiplier 126 thus provides an output which is a function of the perturbation in velocity of the preceding vehicle and the length of time that the rate of change of range of the vehicle 10 has exceeded reasonable limits set by the quantity S. This output is provided as one input of a differential amplifier 132. The other input to that amplifier is derived from a multiplier 134 which has the output of the amplifier 128, representing perturbation in velocity of the preceding vehicle as one of its inputs and quantity $V_{c1}$ multiplied by a constant set by a multiplier 136 as its other input. The output of the differential amplifier 132 is multiplied by a constant set by a multiplier 138 and represents the quantity $V_{cc}$ (compensated control velocity) which is provided to the summing amplifier 30 at the output of the controller 16 and to the model computer 18.

Effectively the higher the value of $V_{cc}$ (and $V_{c1}$) the greater the propulsive forces on the vehicle and the less braking forces. Accordingly, when the measured range is less than the safe separation distance the quantity $V_{c1}$ goes to zero and the quantity $V_{cc}$ becomes maximum in a negative sense. Since the outputs of the multiplier 24 and 26 are conditioned by the quantity $V_{c1}$ maximum braking force is then applied on the vehicle.

At the other extreme, when the measured range exceeds R there is no output from the multiplier 126 so $V_{cc}$ becomes a direct function of $V_{c1}$ and the perturbation in velocity of the preceding vehicle. Between these two extremes, when the measured range exceeds the safe separation distance but is less than the maximum range the control quantity provided the system is dependent on whether the rate of change of range exceeds the limits $=$ or $-S$ and for how long that condition has existed. If the rate of change of range does not exceed L the control signal $V_{cc}$ is again a function of $V_{c1}$ and perturbation in velocity of the preceding vehicle. When the rate of change of range exceeds the limit S the multiplier 126 provides an output proportional to the time elapsed since the rate of change of range reached the limiting value and the perturbation in velocity of the preceding vehicle. This quantity is effectively subtracted from the $V_{c1}$ signal to provide more braking action the longer the system is disturbed.

The embodiments of the invention in which an exclusive property or privilege is claimed are defined as follows:

1. A speed control system for self-powered vehicle, comprising: a source of a speed control signal; means for measuring variables relating to the operation of the vehicle; a controller operative to receive said speed control signal and the outputs of said means for measuring variables associated with the operation of the vehicle; means for controlling the driving system of the vehicle as a function of the output of the controller; a model system for receiving the control signal; means under control of the output of the model and the variables for modifying the operation of the controller in such a manner as to cause the variables associated with the operation of the vehicle to more closely resemble the output of the model.

2. The speed control system of claim 1 wherein the variables relating to operation of the vehicle include the speed of the vehicle.

3. The speed control system of claim 1 wherein the model produces a plurality of outputs each related to one of the measured variables relating to the operation of the vehicle and the modification of the operation of the controller is performed as a function of the difference between the measured variables and the outputs of the model.

4. The speed control system of claim 3 wherein the means under control of the output of the model for modifying the operation of the controller includes a plurality of sensitivity adjustment circuits, one related to each of the measured variables and the controller includes a plurality of adjustable circuits, one associated with each of the variables, and the adjustable circuits of the controller are respectively adjusted as a function of the output of one of the sensitivity circuits and the difference between the outputs of the model system and the measured variables.

5. The speed control system of claim 4 wherein the controller includes one adjustable circuit which receives a measured variable relating to the difference between the speed of the vehicle and the commanded control speed, and a second adjustable circuit which receives the measured acceleration of the vehicle, and the means under control of the output of the model and the variables for modifying the operation of the controller include a velocity sensitivity adjustment circuit and an acceleration sensitivity adjustment circuit.

6. The speed control system of claim 1 further including means for measuring the range from the vehicle to a preceding vehicle moving in the same direction as the vehicle and wherein the speed control signal is modified as a function of the measured range.

7. The speed control system of claim 1 wherein said means under control of the output of the model and the variables for modifying the operation of the controller includes means for determining the difference between the variables and corresponding parts of the output of the model and the degree of modification of operation of the controller which is achieved is a function of such difference.

8. A control system for a vehicle having a propulsion system and a braking system, comprising: a source of a speed control signal; means for measuring the range between the vehicle and a preceding vehicle moving in the same direction as the vehicle; means for modifying the speed control signal as a function of the range; means or measuring variables relating to the operation of the vehicle; a controller operative to receive said range function modified speed control signal and the outputs of said means for measuring variables associated with the operation of the vehicle; means for controlling the propulsion and braking system of the vehicle as a function of the output of the controller; a model system for receiving the range function modified speed control signal and for providing a plurality of outputs each representing the ideal value of one of said variables relating to the operation of the vehicle; and means under control of the outputs of the model and the measured variables for modifying the operation of the controller in such a manner as to cause the variables associated with the operation of the vehicle to more closely resemble the outputs of the model independent of variations in parameters relating to the vehicle system.

9. The speed control system of claim 8 wherein the means under control of the outputs of the model and the variables for modifying the operating of the controller includes means for generating signals proportional to the difference between each of the outputs of the model and its related measured variable.

10. The speed control system of claim 9 wherein the means are under control of the outputs of the model and the variables for modifying the operation of the controller include a plurality of sensitivity circuits, each relating to one of the measured variables of the vehicle and each providing an output which is a function of the sensitivity to the vehicle response to a change in such vehicle parameter.

11. A speed control system for a self-powered vehicle, comprising: a source of an ideal speed control signal; means for measuring the range between a vehicle and a preceding vehicle moving in traffic in the same direction as the vehicle; means for computing a safe separation distance between the vehicle and the preceding vehicle as a function of the ideal speed control signal; means for generating a modified speed control signal which consists of a function of said ideal speed control signal at such time as the measured range to the preceding vehicle exceeds the computer safe separation distance and constitutes an emergency signal at such time as the measured range is less than the computer safe separation distance; means for measuring variables relating to the operation of the vehicle; a controller operative to receive said modified speed control signal and the outputs of said means for measuring variables associated with the operation of the vehicle; means for controlling the driving system of the vehicle as a function of the output of the controller; a model system for receiving the modified speed control signal; and means under control of the output of the model and the variables for modifying the operation of the controller in such a manner as to cause the variables associated with the operation of the vehicle to more closely resemble the outputs of the model.

12. The speed control system of claim 11 further including means for altering the modified speed control signal as a function of the length of time that the rate of change of the range signal has exceeded a predetermined limit.

13. The speed control system of claim 12 wherein said means for altering the modified speed control signal as a function of the length of time that the rate of change or range signal has exceeded a predetermined limit is disabled at such time as the range exceeds a predetermined limit.

14. The speed control system of claim 12 wherein the modified speed control signal is altered as a function of the perturbation in position of the preceding vehicles as derived from the range signal.

* * * * *